United States Patent [19]

Capjon et al.

[11] Patent Number: 5,607,170
[45] Date of Patent: Mar. 4, 1997

[54] SULKY

[75] Inventors: Jan Capjon, Fagerstrand; Atle Nygaardsvik, Fjellstrand, both of Norway

[73] Assignee: Volotech AS, Stavanger, Norway

[21] Appl. No.: 343,469

[22] PCT Filed: May 27, 1993

[86] PCT No.: PCT/NO93/00005

§ 371 Date: Jan. 9, 1995

§ 102(e) Date: Jan. 9, 1995

[87] PCT Pub. No.: WO93/24354

PCT Pub. Date: Dec. 9, 1994

[30] Foreign Application Priority Data

May 29, 1992 [NO] Norway .................................. 922156

[51] Int. Cl.[6] ...................................................... B62C 1/08
[52] U.S. Cl. ........................................ 280/63; 280/47.131
[58] Field of Search .................................... 280/63, 64, 65, 280/66, 67, 68, 69, 70, 71, 72, 73, 74, 75, 76, 77, 471.131; 403/378, 379

[56] References Cited

U.S. PATENT DOCUMENTS

| 571,003 | 11/1896 | Keeler | 280/64 |
|---|---|---|---|
| 2,872,227 | 2/1959 | Wachs | 403/379 |
| 3,907,325 | 9/1975 | Gaines et al. | 280/63 |
| 4,078,839 | 3/1978 | Davis | 280/63 |
| 4,135,730 | 1/1979 | Yunick | 280/65 |
| 4,392,663 | 7/1983 | Forslund | 280/75 |
| 4,625,981 | 12/1986 | Marchionne | 280/63 |
| 4,767,233 | 8/1988 | Erickson | 403/378 |
| 4,817,975 | 4/1989 | Saraydar | 280/63 |
| 4,993,728 | 2/1991 | Loporcaro et al. | 280/63 |
| 5,062,652 | 11/1991 | Burke | 280/64 |

FOREIGN PATENT DOCUMENTS

| 2748437 | 5/1979 | Germany | 280/63 |
|---|---|---|---|
| 350738 | 11/1972 | Sweden . | |
| 8202219 | 8/1983 | Sweden . | |

*Primary Examiner*—Brian L. Johnson
*Assistant Examiner*—Min Yu
*Attorney, Agent, or Firm*—Rothwell, Figg, Ernst & Kurz, P.C.

[57] ABSTRACT

Sulky comprising two wheels individually fastened along the same rotational axis, to a common structure provided with a driver's seat (4) and shafts (3) leading towards the draught animal. The sulky (1) consists of a construction kit comprising a plurality of substantially flat elements (2, 3, 4, 5, 6) adapted to be assembled by the end user by means of ordinary hand tools. Two of these parts are end frames (5) adapted for fastening of a wheel (2), a shaft (3), and the crossbar (6) in the same vertical plane.

19 Claims, 2 Drawing Sheets

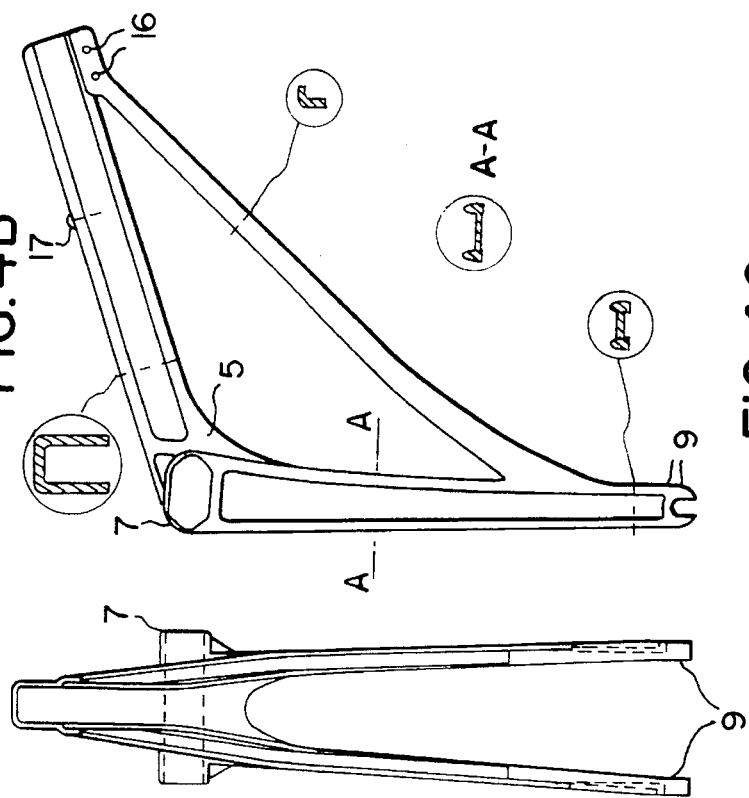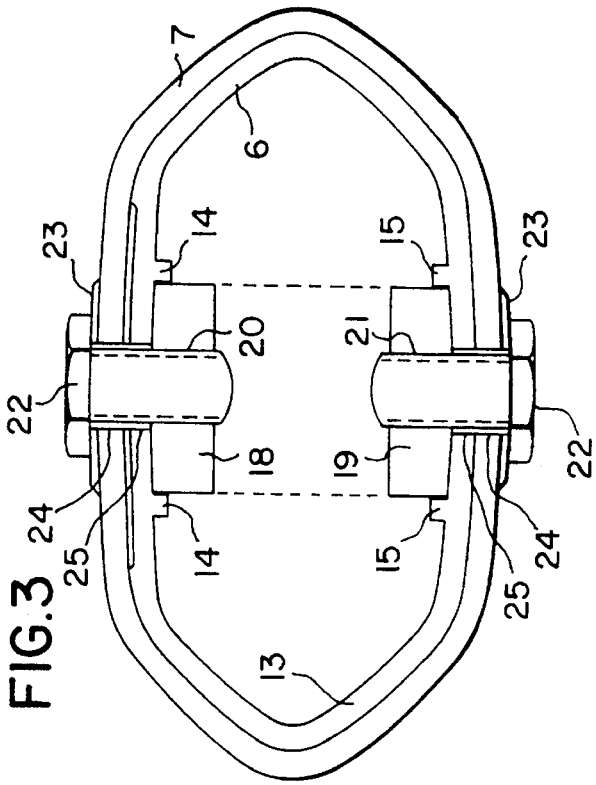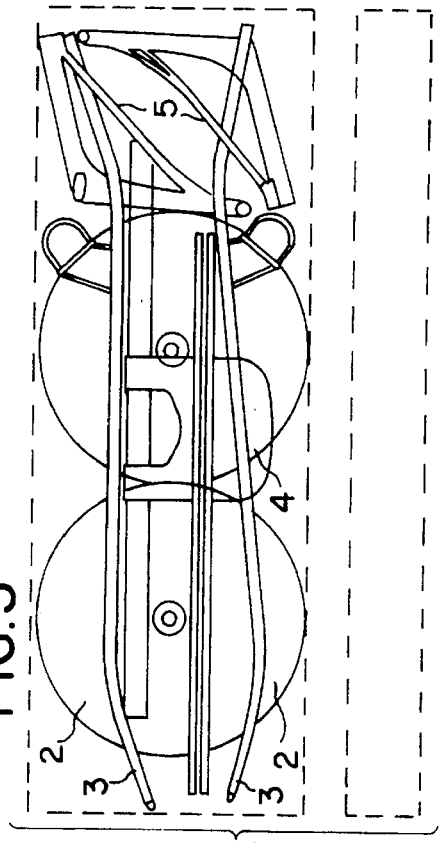

SULKY

FIELD OF THE INVENTION

The present invention relates to a sulky comprising two wheels, individually fastened, but located along the same rotational axis, to a common frame provided with a driver's seat and shafts leading towards the draught animal.

DESCRIPTION OF RELEVANT ART

Sulkies of this type are used for trotting races and the most important requirements are that they have a lightweight construction, that they are easy-running, and that they are strongly built to endure the specific strain during excercise and competitions.

To obtain constructions of a sufficiently stiff and stable structure and at the same time of lowest possible weight, sulkies so far have been manufactured as welded steel constructions as this has led to the most lightweight construction combined with sufficient strength.

Certainly there have earlier been attempts to build sulkies of aluminium, however such sulkies have got a rather bad reputation due to poor strength qualities.

A conventional sulky has its shafts fastened approximately 10 cms inside of the wheels. This fact leads to a construction well adapted for welded steel pipes, but it is unsuitable when light metals are used because the construction then requires welding. This is probably the reason why earlier attempts using aluminium have failed, as the design then has been similar to the conventional steel constructions requiring a welding process. It is a fact that aluminium and other light metals are difficult to weld, in particular weaknesses in the metal can not be allowed at, or close to, the welding points.

Storing and transportation of conventional sulkies has led to difficulties due to the sulkies having an awkward shape. The manufacturing process has also been expensive and much handwork has been required. Sulkies having even less weight have always been desirable, even if specialists in this field of technique have been convinced that still lighter sulkies could not be manufactured without a corresponding strength reduction.

SUMMARY OF THE INVENTION

The object of the present invention is to provide a new sulky construction having such a design that it may be manufactured of light metal and other lightweight and yet durable materials.

A further object of the present invention is to provide a sulky which may be assembled easily by a user himself, from substantially flat elements requiring only a small space during storage and transportation, said elements being easily dispatched in a flat package.

Still a further object of the present invention is to build up a sulky from inexpensive semi-produced components as casted elements and extruded profiles.

Still a further object of the present invention is to provide a sulky having a stable construction as the shafts as well as the crossbar transfer substantially all the load to the wheel planes only.

Finally it may be mentioned that an object of the present invention is to provide a sulky which easily may be assembled by the user himself by means of ordinary hand tool, and where all the connections become secure, without any play, even if the single components are produced with ordinary manufacturing tolerances.

It should be mentioned that the new sulky construction having shafts fastened to the frame in the planes of the wheels results in the possibility of avoiding the traditional manual manufacturing process including welding of each individual sulky and instead using casting and mass production with corresponding low expenses. By changing to a casting process many of the details required in connection with the wheel suspension, the fastening of the shafts and the crossbar to the frame, may be integrated in the casting process without any additional expenditures. A design of the end frames as stated in connection with the present invention is also required to obtain a structure being well suited for box packaging and do-it-yourself kits based on simple threaded connections.

There is also obtained a weight reduction of approximately 40% for the complete sulky which has a total weight of approximately 18 kg in a ready-to-use state.

Finally it should be mentioned that a sulky according to the present invention in particular is designed to be colored by applying color tapes in all recesses of the profiles, a solution which leads to an inexpensive and individual color display system important for the end users.

BRIEF DESCRIPTION OF THE DRAWINGS

To give a clear understanding of the present invention reference is made to the detailed description of an embodiment given below, and to the accompanying drawings in which:

FIG. 3 illustrates a cross section of the crossbar at the connection to an end frame, FIGS. 4A–4C show an end frame in more detail, and FIG. 5 shows how a dismantled sulky may be arranged in a flat package.

DETAILED DESCRIPTION OF PREFERRED EMBODIMENTS

In all of the Figures the same reference numbers are used for components having the same function, when appropriate.

Figure 1:
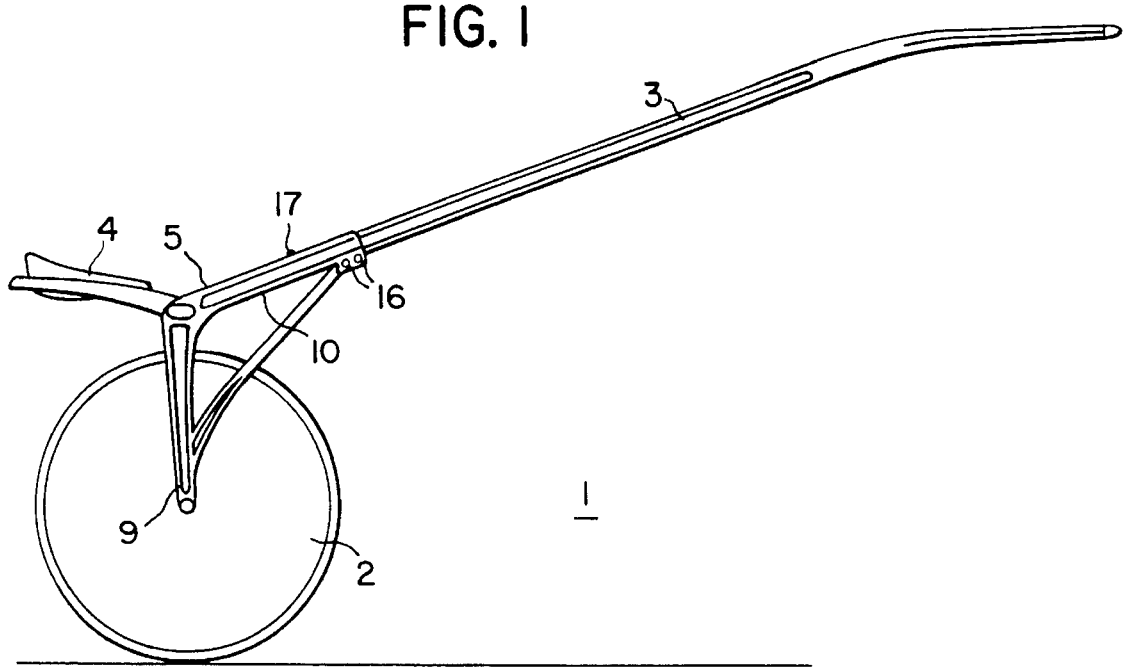
FIG. 1 illustrates a side view of a sulky according to the present invention.

In FIG. 1 the sulky 1 is shown in a side view, and it may be seen that both the wheel 2 and the shaft 3 are mounted to the end frame 5.

Figure 2:
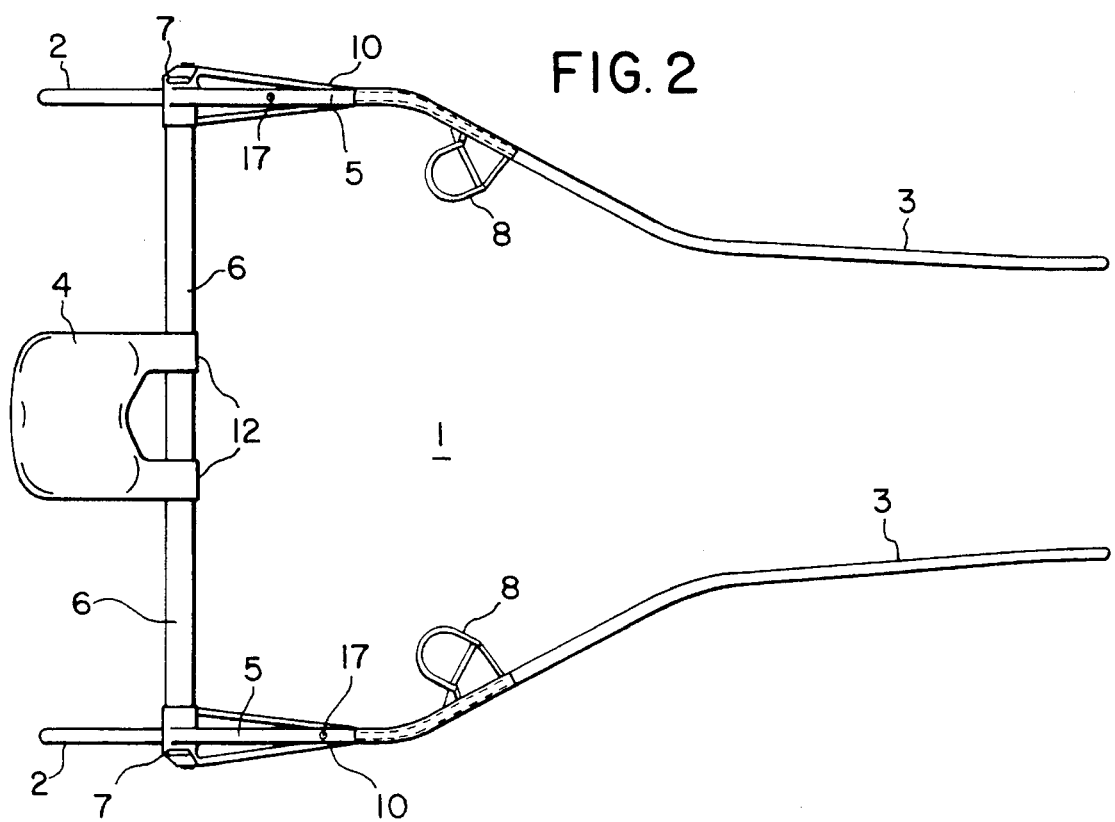
FIG. 2 illustrates a top view of a sulky according to FIG. 1.

When FIG. 2, which shows the same sulky as in FIG. 1, but now seen from above, is compared with FIG. 1, where the same reference numbers are used, it may be seen that the driver's seat 4 is arranged centrally on the crossbar 6 which is fastened to the mounting bushings 7 in the end frames 5.

In FIG. 2 the foot treads 8 fastened to the shafts 3 also are shown, and FIG. 2 in particular shows how the end frames are shaped so that the wheel-fastening, shaft-fastening and crossbar-fastening devices all are arranged in the same vertical plane. This is important to obtain a best possible load situation.

As shown in FIGS. 1 and 2 the end frames 5 are arranged symmetrically related to the plane of the wheels 2. This leads to a stable construction of the sulky, but differs from conventional solutions. It may also be understood from FIGS. 1 and 2 that the crossbar 6 is adapted to the mounting bushings 7 and may be fastened thereto. An example of the assembly of those joints is described in more detail below. The details of these joints are important to obtain a stable and rigid frame which may resist the strain occuring during use, and this may be obtained without demanding requirements on the materials in these components or to the manufacturing tolerances of same. According to a preferred embodiment of the present invention the end frames 5, preferably of aluminium or a similar light metal, are casted, e.g. by means of a chill-casting or press-casting process using a light metal, or alternatively by producing the frames of reinforced plastics while the crossbar 6 may be manufactured of extruded aluminium or a similar light metal. Despite the inexpensive process and easily workable materials the geometric design leads to a stable and reliable construction.

The wheels may be fastened to a fork section 9 of the end frames 5 by means of conventional fastening technique, and in a similar manner the shafts 3, which may be made of light metal or plastics reinforced e.g. by carbon fibers, may be fastened to the end frames 5 by means of horizontally arranged fastening bolts 16 and further fastening screws 17 arranged in corresponding holes in the shaft 3. Thereby a fastening of the shaft so as to be adjustable in a longitudinal direction is obtained.

Finally it may be mentioned that the driver's seat 4 is fastened to the crossbar 6 by means of extruded brackets 12 which, if required, may be clamped thereto by means of conventional clamping devices comprising screws or bolts.

The crossbar 6 and the fastening of the same in one of the mounting bushings 7, is shown in more detail at the cross section illustrated in FIG. 3. The crossbar may be designed as an extruded aluminium profile 13 having a closed cross section with internal extending protrusions 14 and 15. In addition there are strengthening elements 18, 19 adapted to fit in with friction between the protrusions 14 and 15. Centrally in these strengthening elements threaded holes 20 and 21 are arranged, and the strengthening elements may be shifted along the aluminum profile 13 to a suitable place so that the threaded holes 20 and 21 coincide with the assembling recesses in the profile 13 and the mounting bushing 7. It may be noted that the strengthening elements 18, 19, arranged on diametrically and opposite faces of the aluminium profile 13, may be combined in one common integrated part as they may be designed, for example as a U-shaped or O-shaped bracket which may be shifted within the track made up of the protrusions 14 and 15. The material of the strengthening elements 18 and 19 may be stainless steel or a similar material having a higher rigidity than the material of the extruded profile 13.

In FIG. 3 one of the mounting bushings 7 is shown together with through screws 22 adapted for fastening the crossbar 6 to the mounting bushing 7. In this connection it is important that the manufacturing tolerances during extruding and casting allow easy introduction of the extruded profile 13 in the mounting bushing 7 with suitable play, however, in such a manner that the materials have a flexibility and deformability adapted so that when the screws 22 are tightened, the extruded profile and mounting bushing 7 will be pulled together by the strengthening elements 18 and 19 respectively, and possibly between oppositely arranged, external strengthening washers 23. After this tightening process the surfaces of the crossbar 6 and the mounting bushing 7 have been somewhat deformed, and therefore an exact adaptation is obtained. It should also be noted that outside the mounting bushing 7 there may also be placed strengthening washers 23, possibly counter bored in the bushing wall so that the material of the bushing 7 and the material of the extruded profile 13 are squeezed between element 19 and a washer of non-corrosive material 23, respectively, and are forcibly pressed towards the rigid bushing 7. Even if the manufacturing tolerances of the extruded profile and the bushing initially left some mutual play, the tightening of the bolt 22 deforms the material so that a close and durable connection is obtained. This connection method ensures a stable and reliable assembly using very simple means.

In FIGS. 4A–4C still more details of the end frame 5 are shown. Here the cross sections of the different parts of the frame also are illustrated. It may in particular be mentioned that the mounting bushing 7 has a cross section that with a certain play is adapted to the external section of the extruded aluminium profile which constitutes the crossbar 6 and is shown in FIG. 3. The loads are evenly distributed due to the symmetrical design of the end frames relative to the wheel planes, and this fact also contributes to a reliable solution in spite of the simple mounting process. The end frame has such a design that it may be cast in a tool comprising only one core and two side walls. The core may be pulled out vertically in a downward direction on the drawing, while all the side elements are bent out to slip the casted element, and the inside and outside of the mounting bushing 7 are formed in contact with the side elements.

The right and the left end frames are preferably casted in the same tool and are therefore quite identical when casted. The tool expenses therefore are reduced and also the storing charges as the number of spare parts also are reduced. In the shown embodiment the external part of the mounting bushing 7 is removed from opposite sides of the end frames before the assembly process, and the resulting holes are covered by caps. However, the invention comprises embodiments where the two end frames are maintained identical also after assembly.

If the qualities of the material and the cross section so allow, the central parts of the crossbar, i.e. the region where the bending moment reaches its maximum value during use, may be reinforced by introducing a square profile between the protrusions 14 and 15.

An important advantage of the present invention is that the complete sulky may be packed into a flat box for storing and transportation to distributers. The user may then buy the sulky as a construction kit and mount the parts himself in a quarter of an hour and then obtain a reliable and professional sulky having a lower total weight but with user qualities equal to those of traditional sulkies. It should also be mentioned that the end frames 5 are identical during production and thus freely may be used on the right or the left side of the sulky. The protruding part of the mounting bushing 7 may then be removed by a simple cutting process before assembly.

We claim:

1. A sulky comprising:

two wheels having a substantially flat configuration;

a driver seat having a substantially flat configuration connected to a chassis;

said chassis including a plurality of substantially flat elements detachably assembled together so as to be easily removable from each other by hand tools, the plurality of substantially flat elements including a crossbar, a pair of shafts, and a pair of end frames, said end frames each having a substantially triangular shape with three corners and having mounting structures detachably connecting the shafts and crossbar to the end frames with the crossbar extending between the end frames and one of the shafts extending away from each respective end frame, said end frames further being detachably mounted to, respectively, the two wheels such that the connections between one of said end frames and one of said shafts and an end of the crossbar are disposed, at longitudinally spaced locations, in a substantially common vertical plane extending substantially longitudinally to the sulky and through substantially the center of the wheel;

whereby a user may assemble and disassemble the sulky in a simple manner using ordinary hand tools.

2. A sulky according to claim 1, wherein each of said frames is a single piece element.

3. A sulky according to claim 1, wherein each of said frames is a single piece casting.

4. A sulky according to claim 1, wherein said connections between said one of said end frames and said one of said wheels, said one of said shafts, and said end of the crossbar are proximate respective ones of said three corners of said substantially triangular shape of said one of said end frames.

5. A sulky according to claim 1, wherein said frames are symmetrical around center planes of said wheels.

6. A sulky according to claim 1, wherein center planes of said wheels are substantially the same as said common vertical planes.

7. A sulky according to claim 1, wherein said end frames each include a fork section surrounding said wheels and connected to said wheels at opposite sides thereof.

8. A sulky comprising:

two wheels having a substantially flat configuration;

a driver seat having a substantially flat configuration connected to a chassis;

said chassis including a plurality of substantially flat elements detachably assembled together so as to be easily removable from each other by hand tools, the plurality of substantially flat elements including a crossbar, a pair of shafts, and a pair of end frames, said end frames having mounting structures detachably connecting the shafts and crossbar to the end frames with the crossbar extending between the end frames and one of the shafts extending away from each respective end frame, said end frames further being detachably mounted to, respectively, the two wheels such that the connections between one of said end frames and one of said shafts and an end of the crossbar are disposed, at longitudinally spaced locations, in a substantially common vertical plane extending substantially longitudinally to the sulky and through substantially the center of the wheel;

whereby a user may assemble and disassemble the sulky in a simple manner using ordinary hand tools; and wherein each of said end frames has a substantially triangular shape with three corners, a first corner being provided with two forked arms detachably mounted to an axle of one of said wheels; a second corner being provided with a mounting bushing arranged substantially parallel to the wheel axle and detachably receiving an end of the crossbar, and the third corner being provided with an assembly opening substantially in the same plane as the wheel and receiving one of said shafts.

9. A sulky according to claim 8 wherein said crossbar includes an extruded hollow profile, with an outer dimension and shape which with a certain play fits into the mounting bushings, the hollow profile being provided with internal fastening means for receiving at least one strengthening element provided with an internal, threaded hole which is adapted to correspond with holes formed, respectively, in the mounting bushing and the hollow profile of the crossbar.

10. A sulky according to claim 9, further including two strengthening elements each comprising a one-piece element provided with a threaded boring positioned diametrically opposite holes in the mounting bushing and in the hollow profile.

11. A sulky according to claim 10, wherein a strengthening washer is arranged on an outer side of the mounting bushing and has unthreaded holes corresponding to said holes in the bushing and hollow profile.

12. A sulky according to claim 10, wherein the material for the end frames and the crossbar is a light metal which may be deformed by strain caused by force applied by ordinary hand tools, while the strengthening elements are formed of a more rigid material.

13. A sulky according to claim 9, wherein the material for the end frames and the crossbar is a light metal which may be deformed by strain caused by force applied by ordinary hand tools, while the strengthening element is formed of a more rigid material.

14. A sulky according to claim 9, wherein a strengthening washer is arranged on an outer side of the mounting bushing and has unthreaded holes corresponding to said holes in the bushing and hollow profile.

15. A sulky according to claim 9, wherein the assembly opening for receiving the shaft is provided with horizontal tightening screws and a vertically arranged set screw which penetrate both the wall of the assembly opening and the shaft mounted therein.

16. A sulky according to claim 8 wherein the assembly opening for receiving the shaft is provided with horizontal tightening screws and a vertically arranged set screw which penetrate both the wall of the assembly opening and the shaft mounted therein.

17. A sulky according to claim 8, wherein the two end frames when assembled have a completely identical geometric shape.

18. A sulky according to claim 17, wherein the end frames are manufactured so that their geometric shapes are identical, and during assembly the end frames are able to be modified by removing an outer portion of the mounting bushing from opposite sides of the respective end frames to form a right and left end frame which when assembled will be symmetric about a central plane of the sulky.

19. A kit for constructing a sulky from a plurality of components which may be assembled by hand tools to form the sulky, the kit comprising:

two wheels having a substantially flat configuration;

a driver seat having a substantially flat configuration;

a crossbar;

a pair of shafts; and a pair of end frames, each of the end frames having a generally triangular shape including a first corner provided with two forked arms for detachably mounting an axle of one of said wheels, a second corner provided with a mounting bushing for detachably receiving an end of the crossbar, and a third corner provided with an assembly opening for receiving one of said shafts;

whereby upon assembly of the sulky the crossbar extends between the end frames and one of the shafts extends away from a respective end frame, and the connections between one of the end frames and one of the shafts and an end of the crossbar are disposed in a substantially common vertical plane extending substantially longitudinally to the sulky and through substantially the center of the wheel.

* * * * *